(12) United States Patent
Rossi

(10) Patent No.: US 7,920,184 B2
(45) Date of Patent: *Apr. 5, 2011

(54) CMOS ACTIVE PIXEL SENSOR WITH A SAMPLE AND HOLD CIRCUIT HAVING MULTIPLE INJECTION CAPACITORS AND A FULLY DIFFERENTIAL CHARGE MODE LINEAR SYNTHESIZER WITH SKEW CONTROL

(75) Inventor: Giuseppe Rossi, Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 150 days.

This patent is subject to a terminal disclaimer.

(21) Appl. No.: 12/352,321

(22) Filed: Jan. 12, 2009

(65) Prior Publication Data

US 2009/0153717 A1 Jun. 18, 2009

Related U.S. Application Data

(60) Continuation of application No. 10/902,854, filed on Aug. 2, 2004, now Pat. No. 7,492,397, which is a division of application No. 10/216,803, filed on Aug. 13, 2002, now Pat. No. 6,861,634.

(51) Int. Cl.
*H01L 27/00* (2006.01)
*H04N 5/217* (2006.01)
(52) U.S. Cl. ........................ 348/241; 348/222.1; 348/308; 250/208.1

(58) Field of Classification Search .................. 348/241, 348/250, 294, 302, 308–312; 250/208.1; 327/91, 94
See application file for complete search history.

(56) References Cited

U.S. PATENT DOCUMENTS

| | | | |
|---|---|---|---|
| 5,579,007 A | 11/1996 | Paul | |
| 5,841,126 A | 11/1998 | Fossum et al. | |
| 6,222,175 B1 | 4/2001 | Krymski | |
| 6,307,195 B1 | 10/2001 | Guidash | |
| 6,694,063 B2 | 2/2004 | Kulhalli et al. | |
| 6,861,634 B2 * | 3/2005 | Rossi | 250/208.1 |
| 6,912,003 B1 | 6/2005 | Apel et al. | |
| 7,133,073 B1 * | 11/2006 | Neter | 348/272 |
| 7,268,814 B1 * | 9/2007 | Pain et al. | 348/294 |
| 7,492,397 B2 * | 2/2009 | Rossi | 348/241 |
| 2001/0030702 A1 * | 10/2001 | Zarnowski et al. | 348/308 |
| 2002/0080406 A1 * | 6/2002 | Kulhalli et al. | 358/3 |

\* cited by examiner

*Primary Examiner* — Sinh Tran
*Assistant Examiner* — Albert H Cutler
(74) *Attorney, Agent, or Firm* — David C. Kellogg

(57) ABSTRACT

An CMOS active pixel sensor (APS) imaging system include circuitry to compensate for different analog offset levels from the CMOS pixel array. More specifically, the compensation is performed in the analog (charge) domain. A digital correction value, which may be measured as part of the operation or testing of the CMOS APS system, is provided to a offset correction block circuit, to generate an analog electrical signal. The analog electrical signal is supplied to a sample-and-hold circuit including a charge amplifier. The signal read from the pixel array, after conditioning through an analog signal chain, is also supplied to the charge amplifier, which has a linear transfer function and outputs the compensated signal.

19 Claims, 12 Drawing Sheets

US 7,920,184 B2

CMOS ACTIVE PIXEL SENSOR WITH A SAMPLE AND HOLD CIRCUIT HAVING MULTIPLE INJECTION CAPACITORS AND A FULLY DIFFERENTIAL CHARGE MODE LINEAR SYNTHESIZER WITH SKEW CONTROL

This application is a continuation of U.S. patent application Ser. No. 10/902,854, filed Aug. 2, 2004, now U.S. Pat. No. 7,492,397 which is a divisional of U.S. patent application Ser. No. 10/216,803, filed Aug. 13, 2002, now U.S. Pat. No. 6,861,634, the subject matter of both of which are incorporated by reference herein.

FIELD OF INVENTION

The present invention relates to CMOS active pixel sensor systems. More specifically, the present invention relates to an apparatus and method for implementing analog offset correction in a CMOS active pixel sensor system.

BACKGROUND THE INVENTION

FIG. 1 is an illustration of a color CMOS active pixel sensor (APS) system 100. The system 100 includes a N×M pixel array 101 comprised of pixels R, G, B respectively sensitive to red, green, and blue colored light. The pixels R, G, B are arranged in a Bayer pattern to model the human visual response. In the Bayer pattern, alternating rows are comprised of green/red and green/blue pixels. Any image focused upon the pixel array causes the pixels to convert the incident light into electrical voltages. Conventionally, each pixel outputs two signals including a reset signal corresponding to a base line voltage level, as well as a photo signal corresponding to the base line voltage level as modified by charge accumulation in the pixel caused by incident light. These two signals may be considered to be different components of a single differential signal, i.e., the pixel signal. The APS system 100 operates by reading the pixel signals of each row, one at a time, from the N×M pixel array to an N×1 row of pixel buffers 102. The pixel buffers 102 are designed to maintain the integrity of the pixel signals output by the pixel array 101, and may be implemented using, for example, sample-and-hold circuits.

The N×1 row of pixel buffers 102 are coupled to a N:1 multiplexer 103, which is used to select a pixel from the N×1 row for further processing. The first processing step is at an analog signal chain 104, which is used to amplify the voltages of the pixel signal. The amplified voltages are stored in a sample-and-hold circuit 105 to accurately capture and hold the amplified voltages. The sample-and-hold circuit 105 is also used as a driver for an analog-to-digital converter 106, which converts the amplified voltages to a digital value.

The above described process is repeated for each pixel in the N×1 row. When the last pixel has been processed, the procedure is repeated using another row, until all M rows of the pixel array has been processed.

An issue associated with the system 100 is that the pixels R, G, B of the pixel array 101 may not be calibrated to the same level. For example, a black image has no light by definition, and thus when the pixel array 101 is exposed to a black image, each of the pixels R, G, B should output a pixel signal corresponding to zero signal. However, when measuring the pixel signals output by the pixels R, G, B, the output of each pixel will tend to vary from the zero signal. These discrepancies are unwanted voltage offsets in the pixel signals, and have several adverse effects. First, they distort the captured image. For example, an image of an uniform field may not appear uniform due to variations in color and/or intensity. Additionally, positive offsets may cause a reduction in the dynamic range of an image, due to a reduction in the useful ranges of voltages presented to the analog-to-digital converter 106. Similarly, negative offsets may cause clipping. Frequently, pixels sensitive to the same color may exhibit similar unwanted voltage offsets. These unwanted voltage offsets can be measured when the system 100 is manufactured, or during system initialization. Thus, the per-color correction values are generally known when the system 100 is operated. Conventional CMOS APS systems generally apply these correction values via digital processing after the voltages have been converted to digital values by the analog-to-digital converter 106. However, digital correction is problematic because correction in the digital domain utilizes valuable processing resources in an imaging system. Additionally, correction in the digital domain does not address dynamic range reduction in the analog processing portion. Accordingly, there is a need and desire for an efficient method and apparatus for applying per-color correction values to eliminate or reduce unwanted voltage offsets output by different color pixels R, G, B in a CMOS APS pixel array.

SUMMARY OF THE INVENTION

The present invention is directed to an apparatus and method which compensates for calibration differences between different pixels elements. More specifically, the present invention includes an offset correction block, which accepts a digital correction value for a pixel to synthesize an analog electric signal corresponding to the digital correction value. In one disclosed embodiment, the analog electric signal is a linear function of the digital correction value, having either a positive or negative slope, and can be skewed by a positive or negative offset. The analog electric signal is supplied to an amplifier operating in the charge domain. The amplifier applies the analog electric signal as a correction to the signal supplied from the pixels, in order to calibrate the pixel read out. In one disclosed embodiment, red, green, and blue colors have independent correction values.

BRIEF DESCRIPTION OF THE DRAWINGS

The foregoing and other advantages and features of the invention will become more apparent from the detailed description of exemplary embodiments of the invention given below with reference to the accompanying drawings in which.

DETAILED DESCRIPTION OF THE INVENTION

Figure 1:
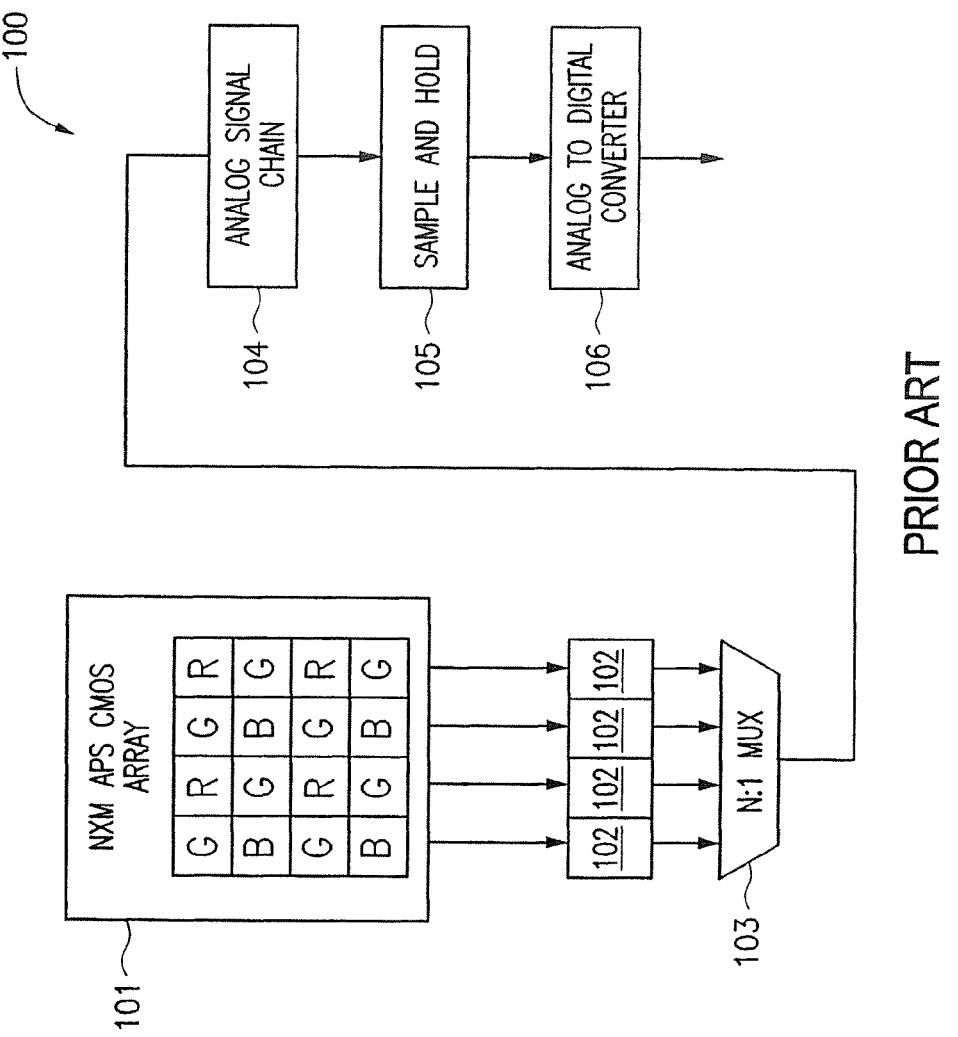
FIG. 1 is a block diagram of a prior art CMOS APS system.
Figure 2:
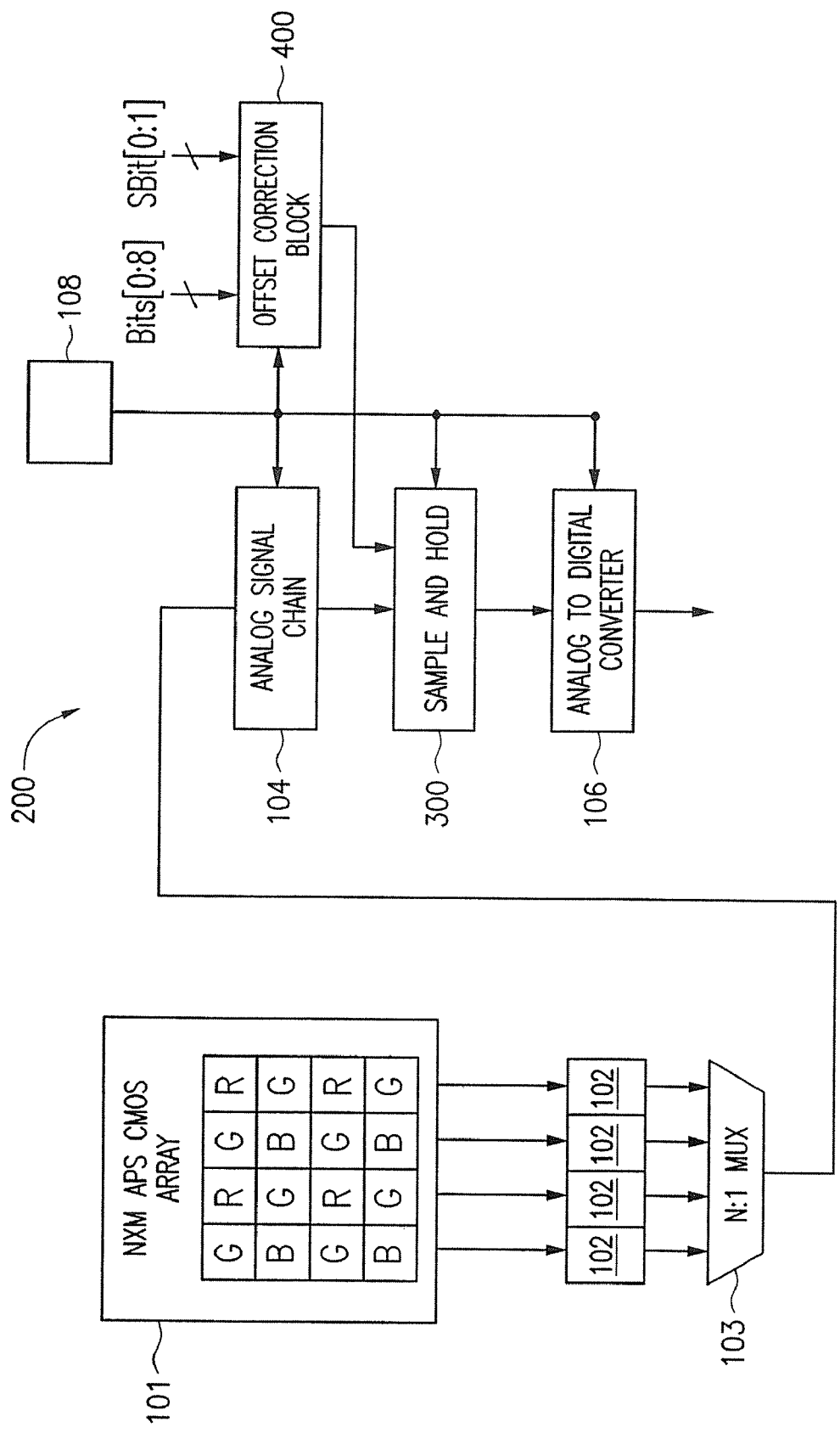
FIG. 2 is a block diagram of a CMOS APS system having an offset correction block and a sample-and-hold circuit in accordance with the principles of the present invention.

Now referring to the drawings, where like reference numerals designate like elements, there is shown in FIG. 2 a block diagram of an APS system 200 which is capable of applying per-color correction values to the output of the pixel array 101. The system 200 shares several components with the CMOS APS system 100 of FIG. 1. For example, both systems 100 and 200 includes a N×M APS CMOS array 101 comprising an array of pixels R, G, B, which are coupled to a row of pixel buffers 102. The output of the pixels R, G, B, i.e., a differential pixel signal comprising a reset signal component and a photo signal component, are transferred one row at a time from the pixel array 101 to the row of pixel buffers 102. The N:1 multiplxer 103 transfers the signals stored in one of the pixel buffers 102 at a time for further processing through an analog signal chain 104, a sample-and-hold circuit 300, and a analog-to-digital converter 106. System 200 also includes several new components. Digital correction signals, i.e., binary values, are supplied to a new offset correction block 400, which generates and supplies an analog correction signal to the sample-and-hold circuit 300. In order to improve signal integrity, the illustrated embodiments utilize differential signaling for communications between major components of the invention. However, it should be recognized that the principles of the present invention are also applicable to systems utilizing single ended signaling.

Figure 3:
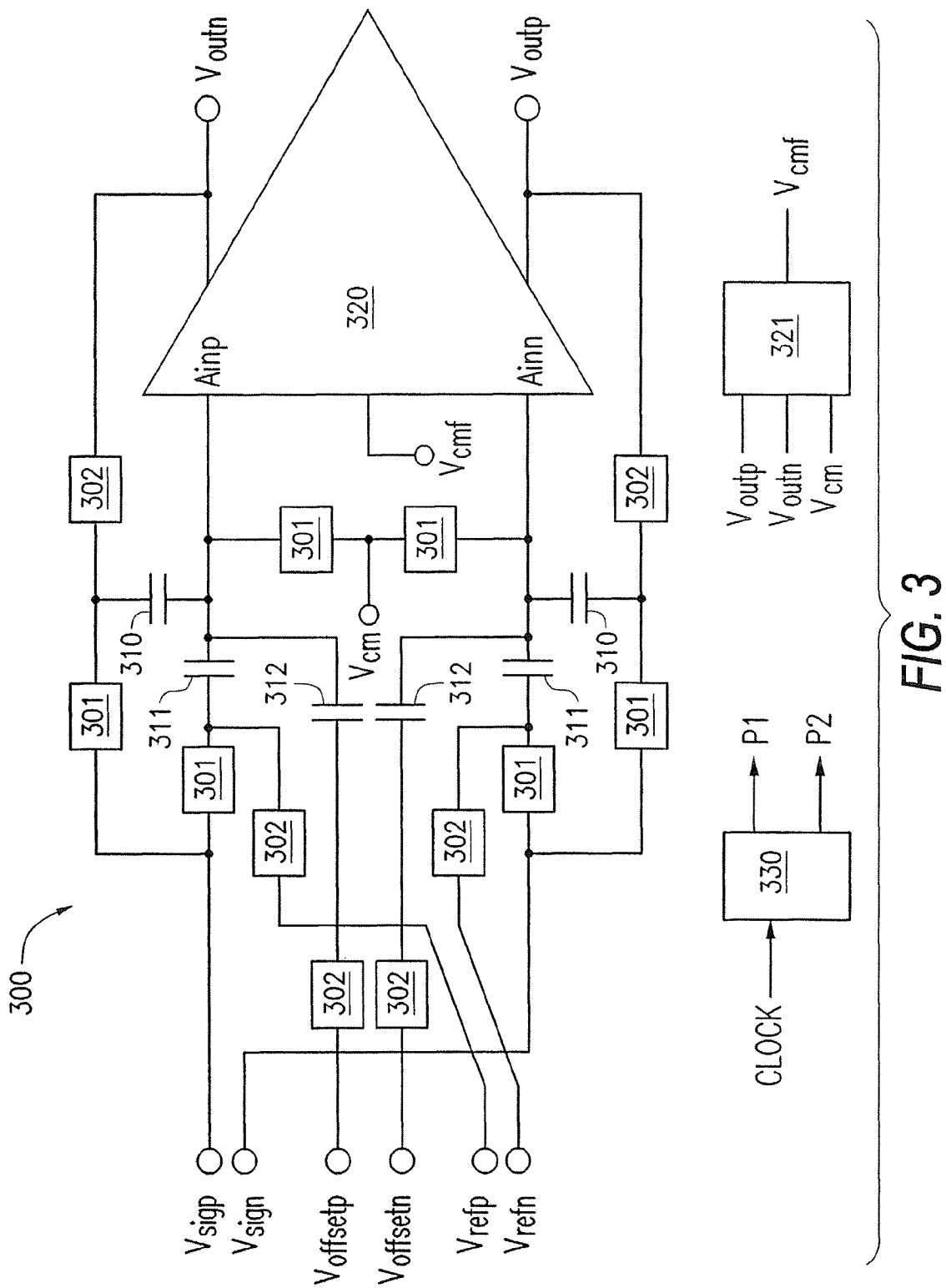
FIG. 3 is a more detailed block diagram of one exemplary sample-and-hold circuit of the present invention.

Now referring to FIG. 3, the sample-and-hold circuit 300 can be seen as comprising a differential amplifier 320, coupled to three sets of differential input signals (i.e., a total of six signal components). These input signals include Vsigp, Vsign, the set of two signal components produced by a pixel R, G, B of the array 101 and subsequently transferred through one of the signal buffers 102, selected by the N:1 multiplexer 103, and processed by the analog signal chain 104. It should be noted that the "p" and "n" suffixes, when applied to signal names, generally refer to the two components of a differential signal. For example, the differential pixel signal Vsigp, Visgn may be comprised of a Vsign component, which may be a reset signal, while the Vsigp component may be a photo signal. The input signals additionally include an offset signal Voffsetp, Voffsetn received from the offset correction block 400, and a constant voltage reference signal Vrefp, Vrefn. The Voffsetp, Voffsetn differential signal will be used to apply a compensation value to the differential pixel signal, while the reference signal may optionally be used to match the output signal of the sample-and-hold circuit 300 to the input range of the analog-to-digital converter 106. Additionally, a common mode voltage Vcm is also coupled to the amplifier 320.

The above described input signals Vsigp, Vsign, Voffsetp, Voffsetn, Vrefp, Vrefn are coupled to the amplifier 320 via corresponding injection capacitors. In particular, capacitors 311 are the injection capacitors corresponding to the signal Vsigp/Vsign received from the analog signal chain 104. The reference signals Vrefp, Verfn are also coupled capacitors 311. Capacitors 312 are the injection capacitors corresponding to the offset signal received from the offset correction block 400.

Figure 7:
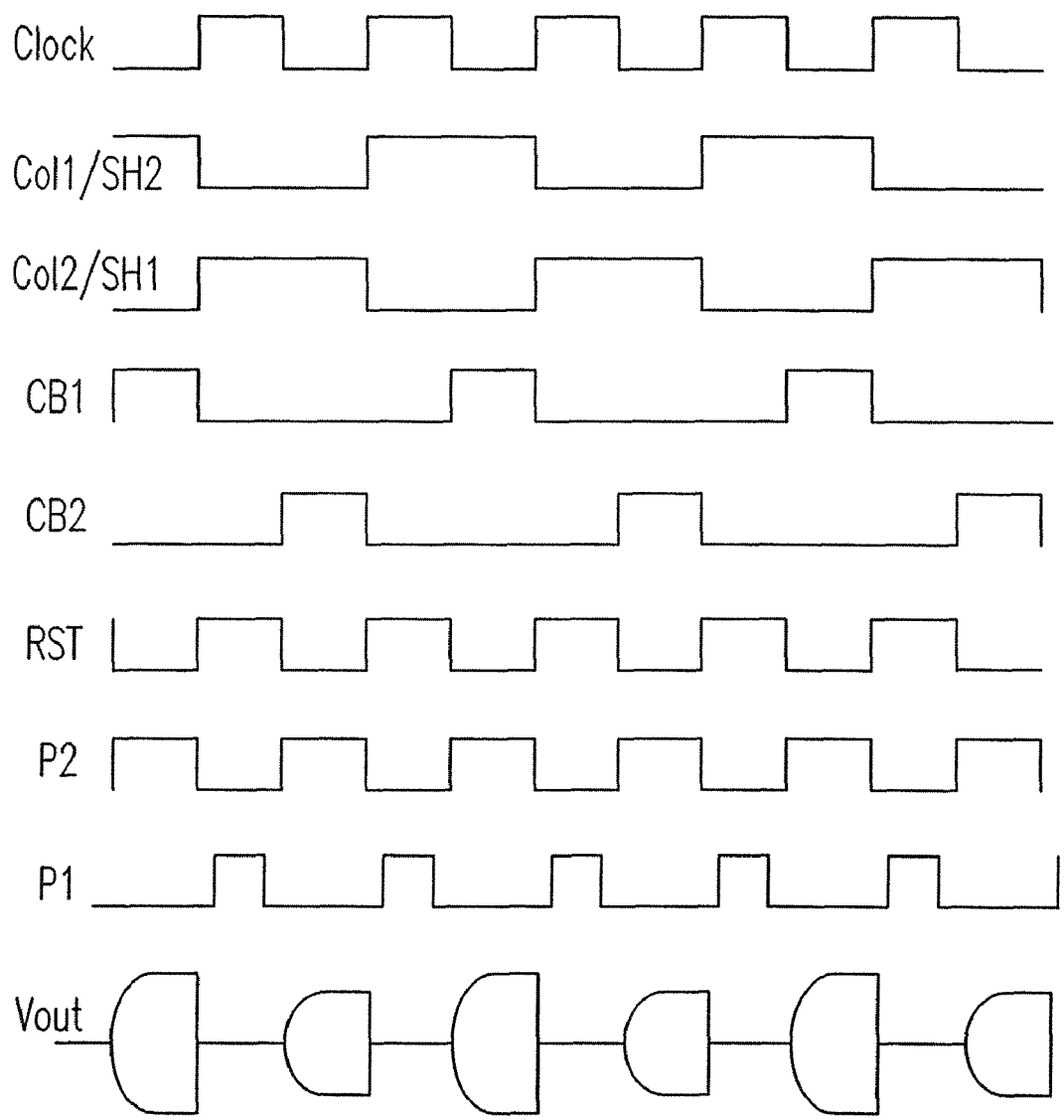
FIG. 7 is a timing diagram.

The sample-and-hold circuit 300 is controlled via a plurality of switches 301, 302. A subclock generator 320 receives a clock signal CLOCK from the master clock generator 108 (FIG. 2) and generates a two phase non-overlapping clock signal in the form of subclock signals P1, P2. In one exemplary embodiment, the period of the CLOCK signal is 80 ns, however, the period of the clock may be altered as necessary to accommodate the timing requirements of an imaging system utilizing the APS system 200. The timing relationship between the master clock signal CLOCK and the two subclock signals P1, P2 can be seen from the timing diagram of FIG. 7. The first subclock signal P1, is used to control a first group of switches 301, while the second subclock signal P2 is used to control a second group of switches 302. When the subclock signals P1, P2 are at a high logic state, the respective switches 301, 302 are set to a closed state. When the subclock signals P1, P2 at a low logic state, the respective switches 301, 302 are set to an open state.

The time when subclock P1 is at a high logic state corresponds to a reset phase for the amplifier 320. During this phase, the common mode voltage switches 301 clamp both input nodes Ainp, Ainn of the amplifier 320 to the common mode voltage Vcm. Additionally, the signal Vsigp, Vsign from the analog signal chain 104 charges injection capacitors 311 and feedback capacitors 310. Finally, a common mode feedback circuit 321 applies common mode feedback Vcmf to the amplifier 320 in order to maintain the amplifier output Voutp, Voutn at the common mode voltage.

The time when subclock P2 is at a high logic state corresponds to an amplification phase for the amplifier 302. During this phase, the charge previously stored on the injection capacitors 311 and feedback capacitors 310 is amplified. A charge amplifier can be treated as a linear system with respect to its transfer function. Thus, the contributions to the amplifier output Voutp, Voutn by the three input signals Vsigp, Vsign, Voffsetp, Voffsetn, Vrefp, and Verfn can be determined individually. The sum of these contributions will be the output signal Voutp, Voutn. More specifically, if the capacitance of injection capacitor 311 is Cs and the capacitance of the feedback capacitor 310 is Cf, the voltage difference of the differential signal corresponding to the Vsigp, Vsign input signal is: $V1=(Vsigp-Vsign)\times(2\,Cs/Cf)$. The voltage difference of the differential signal corresponding to the reference voltage Vrefp, Vrefn is $V2=-(Vrefp-Vrefn)\times(Cs/Cf)$. Finally, if the capacitance of injection capacitors 312 is Coffset, the voltage difference of the differential signal corresponding to the offset signal Voffsetp, Voffsetn is $V3=-(Voffset-Voffsetn)\times(Coffset/Cf)$. At the end of period where subclock P2 is at a high logical state, the amplifier output would be the sum of V1, V2, and V3. In one exemplary embodiment, the capacitors 310, 311, 312 each have the same capacitance and the voltage difference of the amplifier output signal is equal to $2\times(Vsigp-Vsign)-(Vrefp-Vrefn)-(Voffsetp-Voffsetn)$.

This sample-and-hold circuit 300 performs offset cancellation in the charge domain by using the signal Vsigp, Vsign from the analog signal chain 104 and the offset signal Voffsetp, Voffsetn from the offset correction block 400 to charge respective capacitors 311, 312. Since the capacitors 311, 312 are charged on each clock cycle, a different offset value can be supplied to this sample-and-hold circuit 300 on each new clock cycle. Thus, a different correction value can be applied to every pixel, if necessary.

Figure 4:
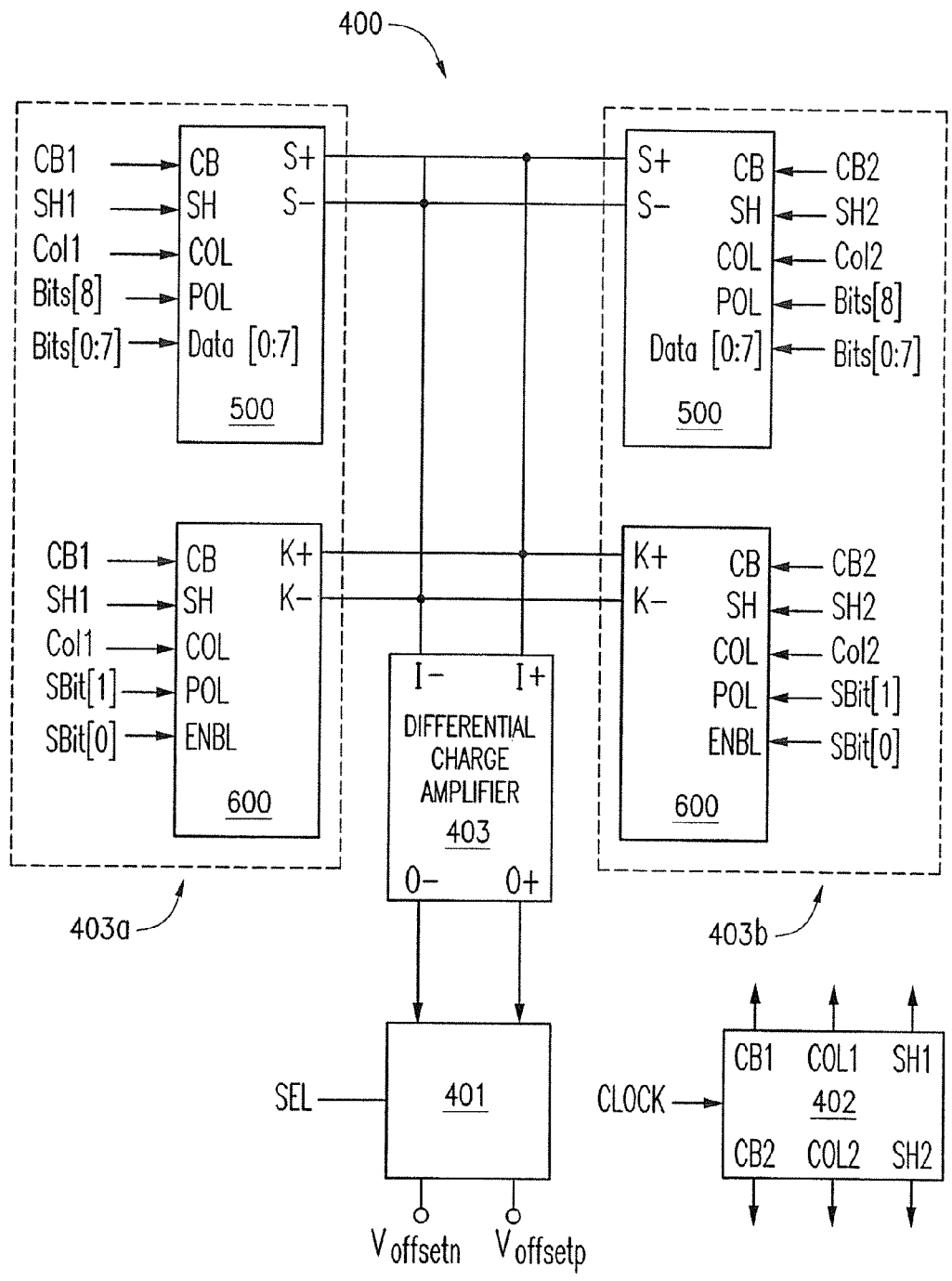
FIG. 4 is a more detailed block diagram of the offset correction block.

As noted above, the correction values supplied to the sample-and-hold circuit 300 is an electrical signal Voffsetp, Voffsetn used to charge injection capacitors 312. The source of the Voffsetp, Voffsetn signal is the offset correction block 400. As illustrated in FIG. 4, the offset correction block 400 includes its own subclock generator 402, which accepts the master clock signal CLOCK and generates additional signals CB1, CB2, COL1, COL2, SH1, and SH2. The relationship of these additional signals relative to the CLOCK signal is illustrated by the timing diagram of FIG. 7.

Although the sample-and-hold circuit 300 can perform offset cancellation using different correction values on each clock cycle, i.e., on a per pixel basis if a new pixel is transferred from the multiplexer 104 to the analog signal, it is often sufficient to provide correction values on a per-color basis. That is, each of the pixel colors, red, green, and blue, would be associated with its own correction value. For example, all red pixels R in the array 101 would under go offset cancellation using the same correction value. The Bayer pattern arrangement of the pixels R, G, B ensures that each row loaded into the multiplexer consists only of green and red (G, R) pixels or green and blue (G, B) pixels. As such, the exemplary embodiment illustrated in FIG. 4 includes two identical column processing sections 403a, 403b. More specifically, one of the column processing sections (e.g., 403a) is used to process, for example, pixels in odd columns, while the other one of the column processing sections (e.g., 403b) is used to process, for example, pixels in even columns. This design therefore permits the column processing sections 403a, 403b to be initialized with one set of parameters for each row since one column processing section will be initialized with parameters suitable for correcting the green pixels G while the other column processing section will be initialized with parameters suitable for correcting the other color pixels (i.e., R or B, depending on the row).

Each column processing section 403a, 403b includes a signal cell 500 and a skew cell 600. These cells are illustrated in greater detail in FIGS. 5A-5C (signal cell 500) and FIGS. 6A-6C (skew cell 600). The design of the signal and skew cells 500, 600 will be described in greater detail below, in connection with the above mentioned diagrams. However, it should be noted that the signal and skew cells 500, 600 are very similar and share many of the same signal inputs. For example, in column processing section 403a, the signal and skew cells 500, 600 share the CB, SH, COL, and POL signal inputs. As illustrated in FIG. 4, the CB, SH, and COL signal inputs may be respectively coupled to the CB1, CB2; SH1, SH2; or COL1, COL2 signals generated by circuit 402 from the CLOCK signal in accordance with the timing diagram of FIG. 7. FIG. 4 also illustrates that the POL signal input may be coupled to the Bits[8] or Sbit[1] signals. These signals are control signals and their functions will be explained in greater detail in connection with the discussion below regarding the signal and skew cells 500, 600. One of the differences between the two types of cells is that the signal cell 500 includes a multi-bit data terminal DATA, while the skew cell has instead a single bit enable terminal ENBL. Additionally, it should also be noted in comparing similar type cells between the two column processing sections 403a, 403b that both column processing sections utilizes the same types of cells. However, similar cells from different column processing sections 403a, 403b may have different signals coupled to some of their respective input terminals. For example, in the two signal cells 500, the 8-bit wide signal Bit[0:7], i.e., the correction to be applied to the output from the analog signal chain 104, is supplied to the data terminal DATA of both signal cells 500, but the CB1 signal is supplied to the CB terminal of the analog cell 500 in column processing section 403a, while the CB2 signal is supplied to the CB terminal of the analog cell 500 in column processing section 403b. Although this exemplary embodiment is described as having an 8-bit wide signal Bit[0:7] from the analog signal chain 104, this invention is not limited to any particular resolution. One skilled in the imaging arts would recognize that different applications may require increased or reduced resolutions and that the circuits shown in the exemplary embodiment may be readily adapted to accommodate different resolutions.

Figure 5A:
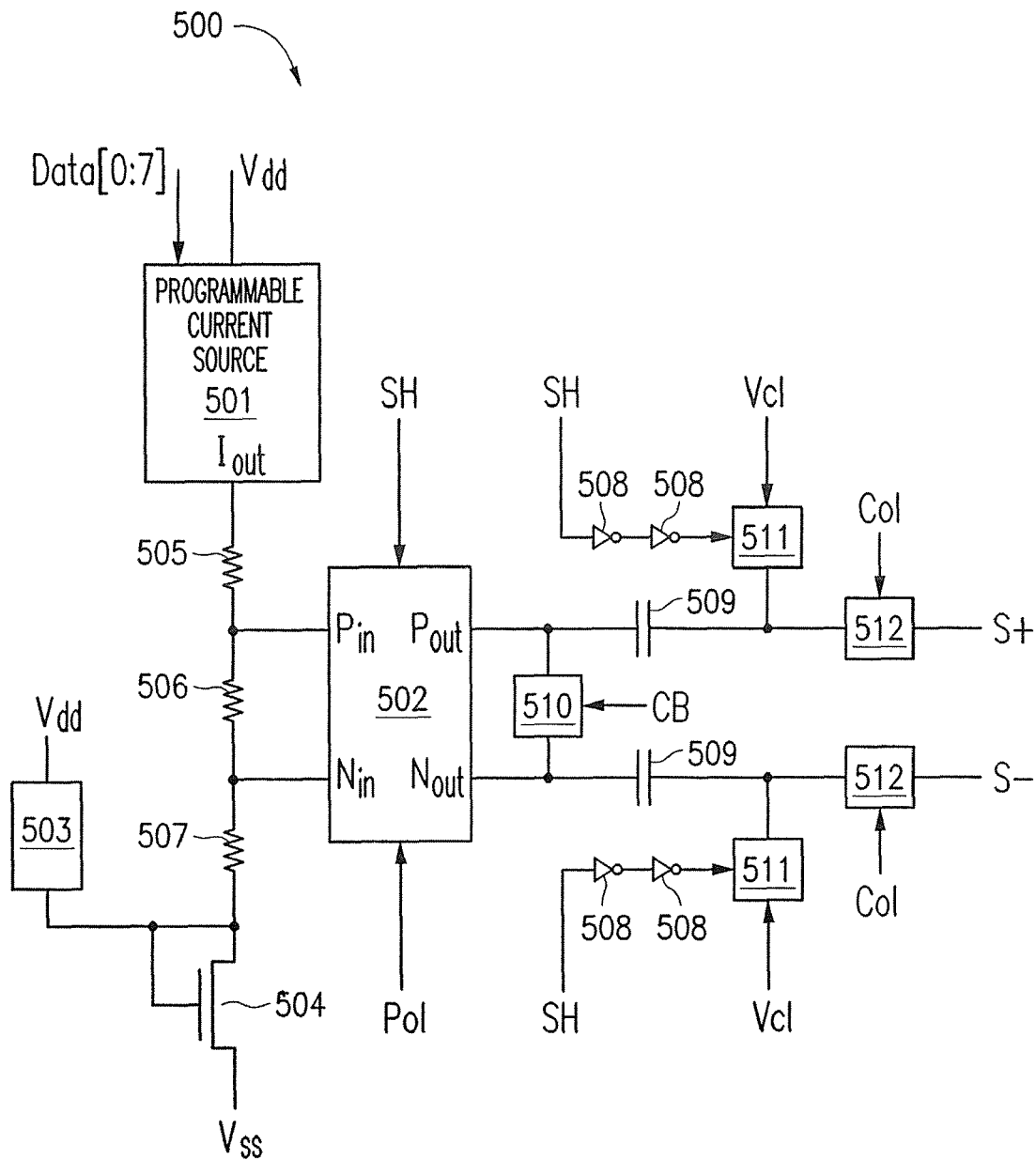
FIG. 5A is a block diagram of a signal cell used in the offset correction block.

Referring now to FIG. 5A, it can be seen that the signal cell 500 is comprised of a programmable current source 501, which provides a source of current from a power source (not illustrated) having a potential level of Vdd to a resister network comprising resistors 505, 506, 507, and ultimately to node having a potential level of Vss. An additional power source 503 and a transistor 504 configured to operate as a diode stabilizes this current flow.

Figure 5B:
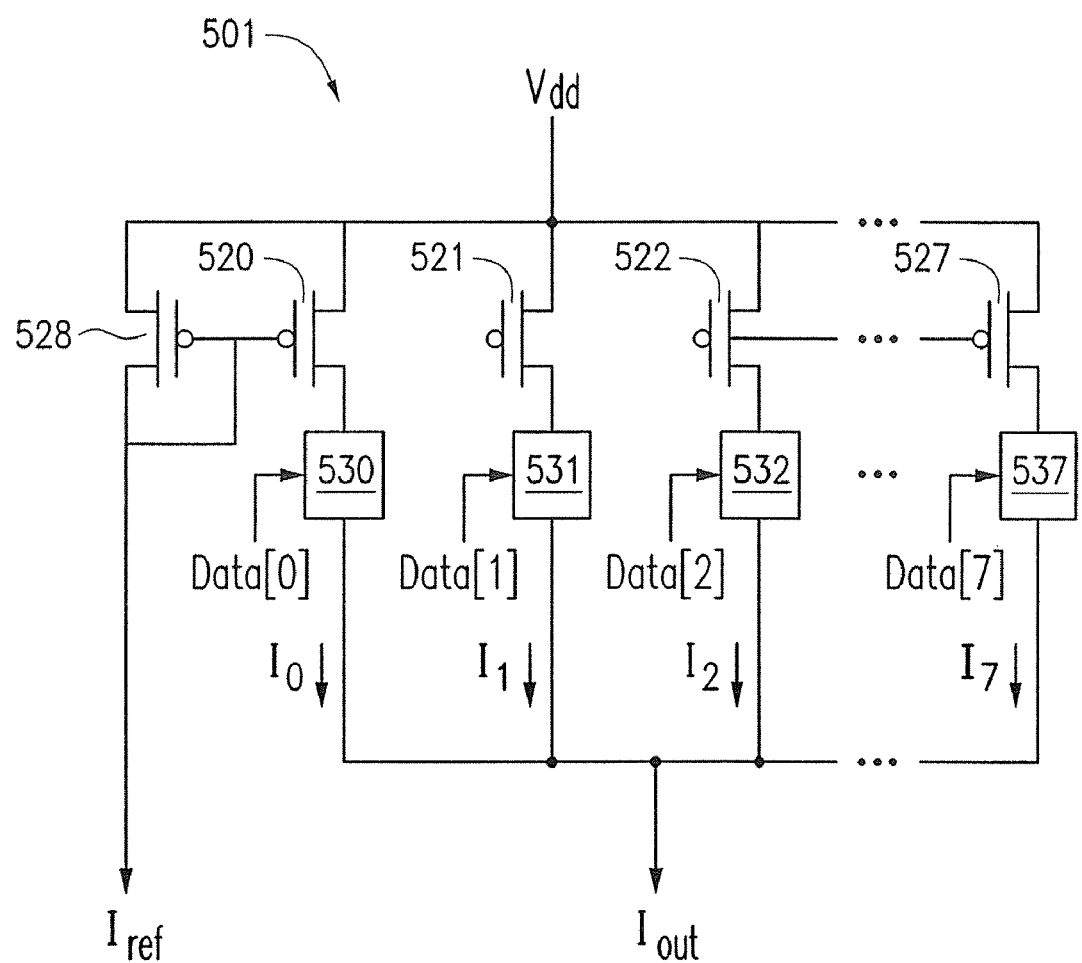
FIG. 5B is a block diagram of a programmable current source, for use with the offset correction block of FIG. 5A.

The programmable current source 501, which is illustrated in greater detail in FIG. 5B, also accepts a multi-bit wide data signal Data[0:7], which controls the output current Iout level. The programmable current source 501 is comprised of an array of binary weighted current mirrors, which multiply the input reference current Iref in a binary manner. The output current is controlled by a plurality of switches 530-537, each of which are controlled to close if a respective portion of the multi-bit wide data signal Data[0:7] is at a logical high (and set to close if at a logical low). For example, if the multi-bit wide data signal Data[0:7] is "00000011," switches 532-537 would be in an open state and currents I2-I7 would be off, while switches 530-531 would be in a closed state and currents I0 and I1 would be on, with current I1 being twice current I0. In one embodiment, the output current Iout ranges from 0.5 micro ampere to 127.5 micro ampere as Data[0:7] ranges from 0 to 255, and the resistors 505-507 are each 1K ohm resistors, however, it should be understood that different ranges of Iout and resistances may also be utilized.

Figure 5C:
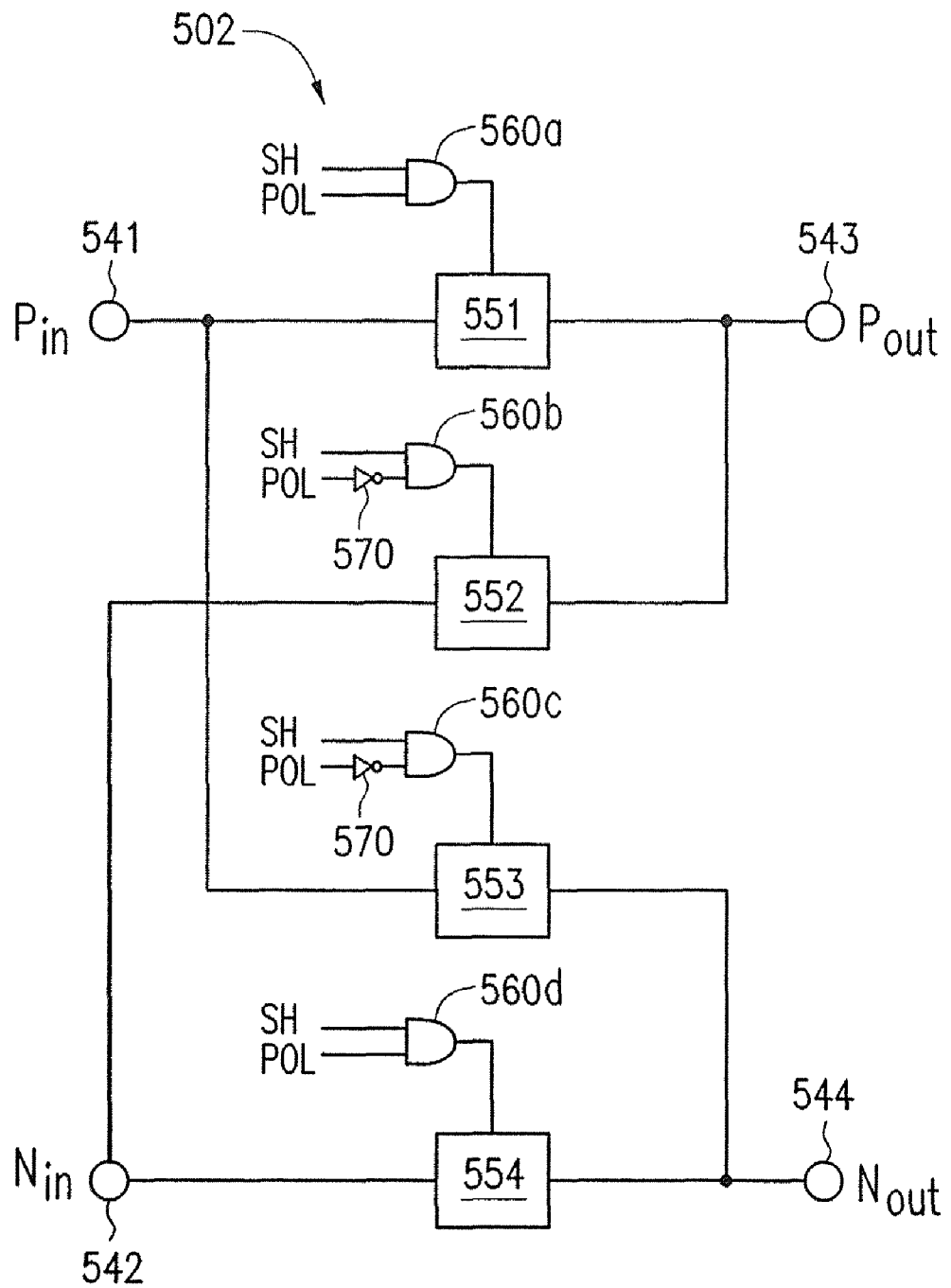
FIG. 5C is a block diagram of a sampling switch used in the first type of analog cell.

Referring again to FIG. 5A, a switch 502 with two input terminals Pin, Nin is coupled to the resistor network at two locations. Input terminal Pin is coupled to the resistor network between resistors 505 and 506, while input terminal Nin is coupled to the resistor network between resistors 506 and 507. The switch 502 includes two output terminals Pout, Nout, and can be controlled via signals SH and POL to decouple Pin, Nin from Pout, Nout, to directly couple Pin, Nin to Pout, Nout or to cross couple Pin, Nin to Nout, Pout. More specifically, as shown in FIG. 5C, the state of the switch 502 is determined by switches 551-554, each of which are controlled by how signals SH and POL are applied to the control terminal of the switches 551-554. The control terminals of switches 551, 554 are coupled to respective AND gates 560a, 560d each of which accepts signals SH and POL. The control terminals of switches 552, 553 are also coupled to respective AND gates 560b, 560c. However, in AND gates 560b, 560c, the POL signal is passed through a respective inverter 570 before being input to the respective AND gates 560b, 560c.

Thus, when SH is at a low logical level, each of the AND gates 560 presents a low logic signal to the control terminal of switches 551-554, causing the switches 551-554 to open, thereby decoupling the input terminals Pin, Nin from the output terminals Pout, Nout. When SH is at a high logical level and when POL is also at a high logic level, the AND gates 560 supply a high logical level to the control terminal of switches 551, 554 and Pin, Nin is directly coupled to Pout, Nout. AND gates 560 also supply a low logic level to switches 552-553, thereby ensuring that Nin and Pout are not coupled, and that Pin and Nout are not coupled. Similarly, when SH is at a logical high and POL is at a logical low, switches 552, 553 are set to a closed state while switches 551, 554 are set to an open state, thereby cross coupling Pin, Nin to Nout, Pout.

The signal cell 500 (FIG. 5A) converts a multi-bit digital word Data[0:8] to a differential analog signal present at output terminals S+, S−. The signal cell 500 performed this conversion in two phases, as controlled by the CB1, CB2, SH1, and SH2 control signals applied to the CB and SH inputs. In the first phase controlled by assertion of the signal applied to the CB input, the output signals Pout, Nout from the switch 502 are coupled to respective sampling capacitors 509. A plurality of switches are coupled to the capacitors 509. These switches include a switch 510, controlled by signal CB to couple the front plates of the capacitors 509 to each other during this first phase.

In the second phase, controlled by the assertion of the signal applied to the SH input, switch 511 couples a clamping voltage Vcl to the back plates of capacitors 509. The clamping voltage Vcl is an offset voltage added to the level of a differential signal, for example +/−. For example, if a differential signal were 0 volts ±0.5 volts and the clamping voltage were 2.0 volt, the differential signal would become 2.0 volts ±0.5 volts. Switches 511 are controlled via the SH signal after it passes through a delay, which may be implemented using a pair of series connected inverters 508. Finally, the COL signal controls the switches 512 to couple to capacitors 509 to the output terminals S+, S−. As illustrated and described above, the differential analog signal is a linear function of the digital word Data[0:7], and has a positive or negative slope, based upon the setting of the Data[8] signal, which becomes the POL (polarity) signal.

Figure 6A:
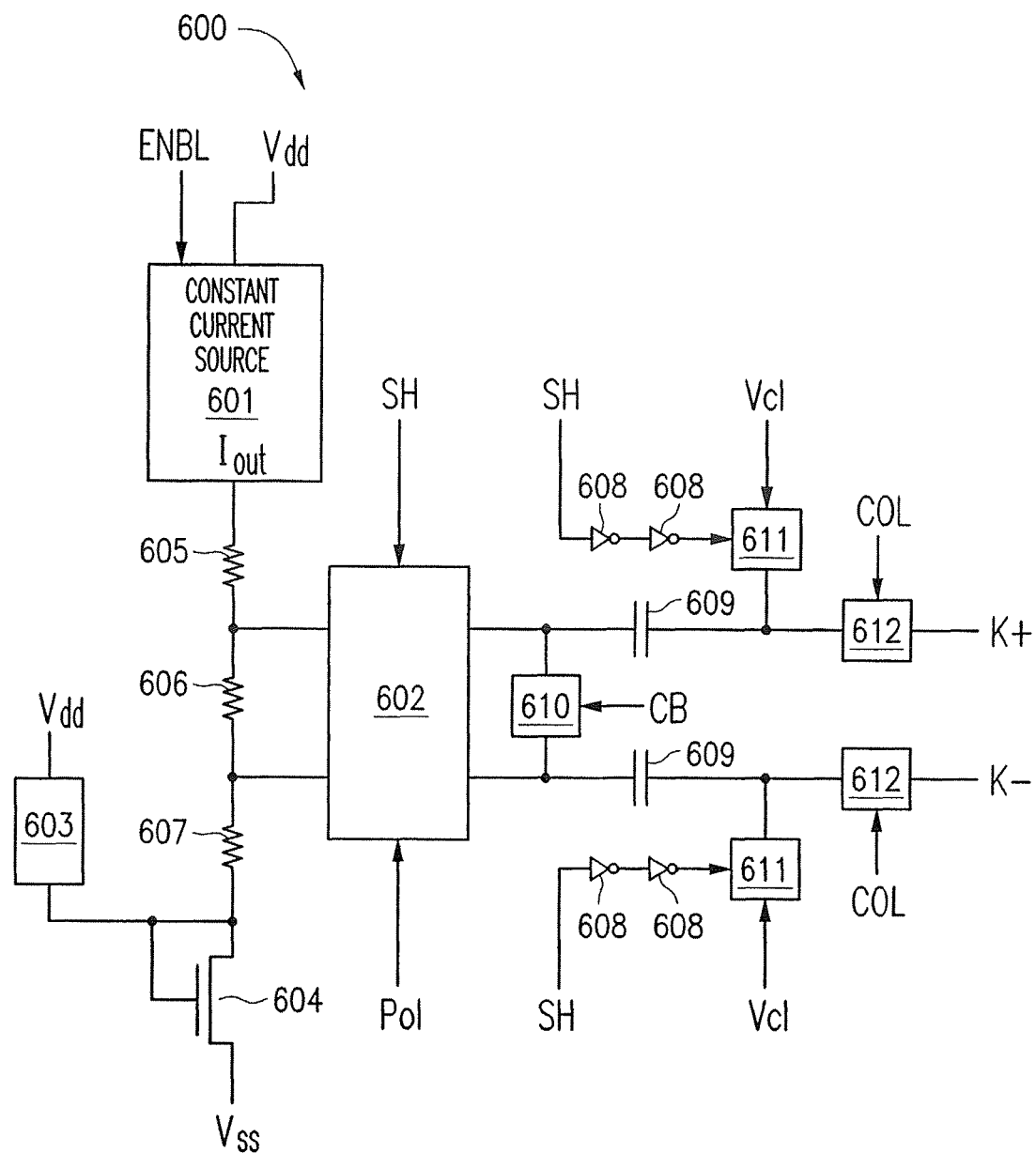
FIG. 6A is a more detailed block diagram of a skew cell used in offset correction block of FIG. 4.
Figure 6B:
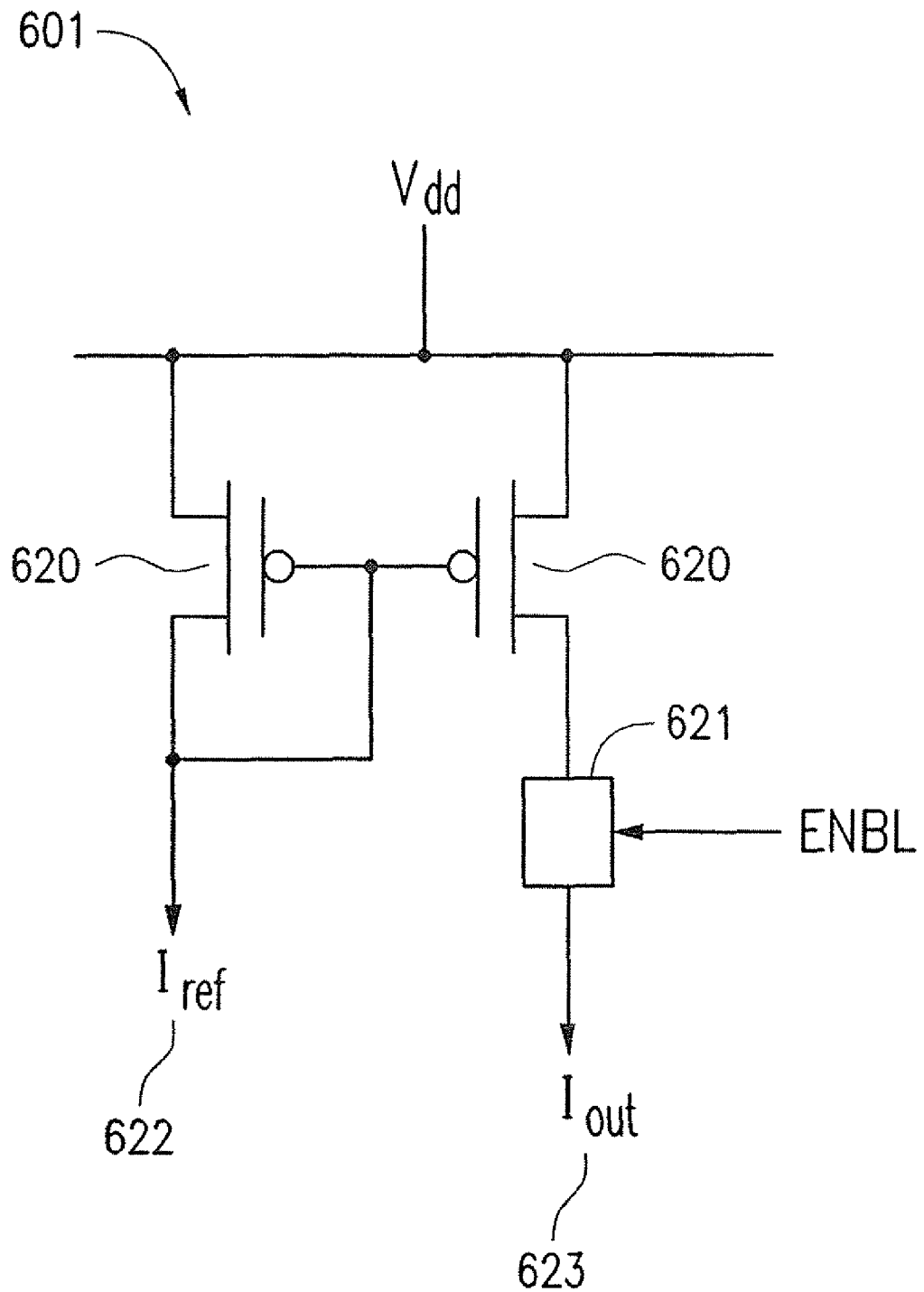
FIG. 6B is a block diagram of a fixed current source, for use with the offset correction block of FIG. 6A.

Referring now to FIG. 6A, it can be seen that the skew cell 600 is similar in construction to the signal cell 500, and is comprised of a constant current source 601, which provides a source of current from a power source (not illustrated) having a potential level of Vdd to a resister network comprising resistors 605, 606, 607, and ultimately to a node having a potential level of Vss. An additional power source 603 and a transistor 604 configured to operate as a diode stabilizes this current flow.

The skew cell 600 utilizes a constant current source 601 (FIG. 6B) instead of the programmable current source 501 of the signal cell 500. The constant current source 601 is a current mirror comprising a power source at potential Vdd supplying power to a current mirror comprising transistors 620. The output current leg of the current mirror is series coupled to a switch controlled by the ENBL signal. The ENBL signal causes the switch 621 to be closed when the ENBL signal is at a high logic state and causes the switch 621 to be open when ENBL is at a low logic state.

Figure 6C:
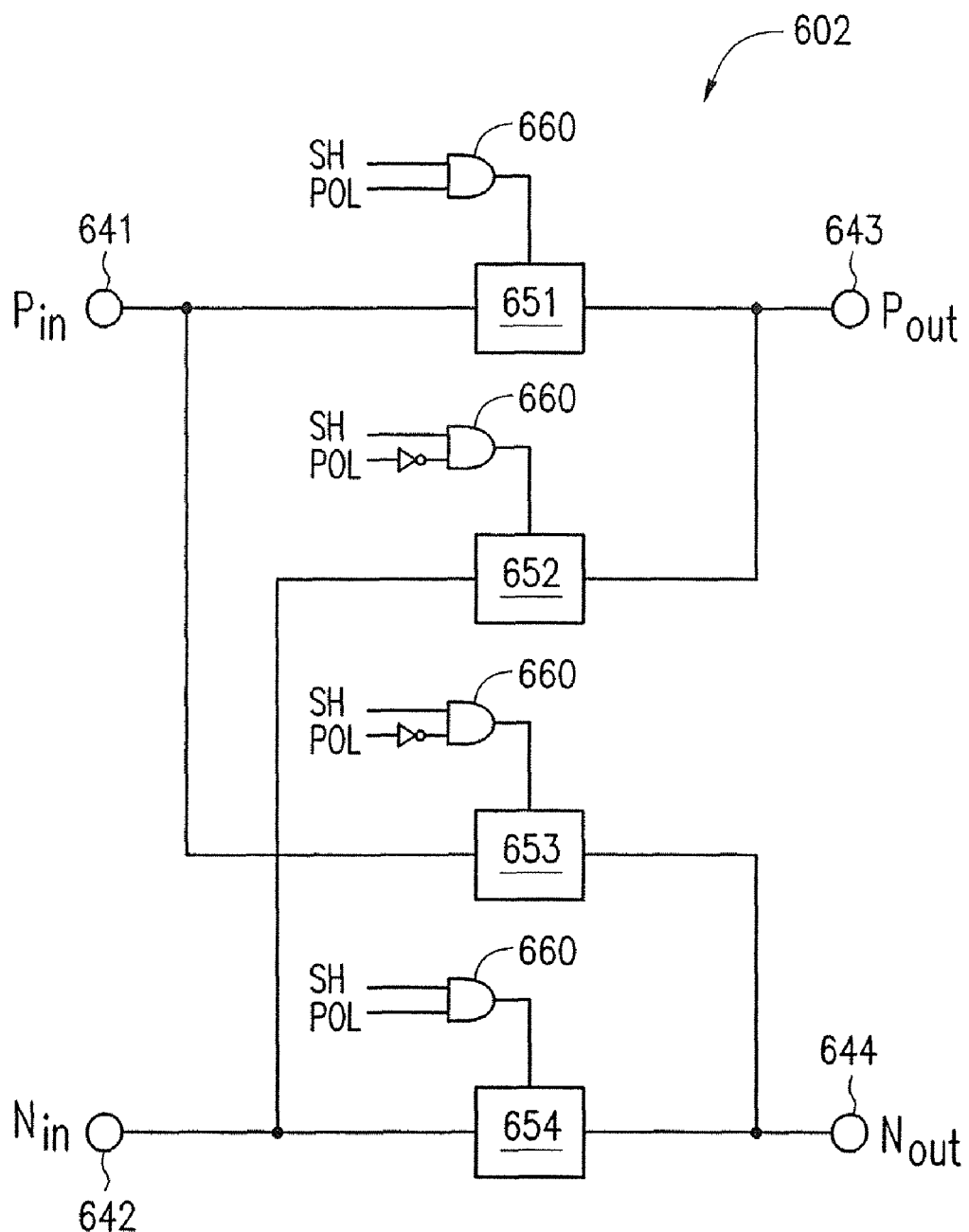
FIG. 6C is a block diagram of a sampling switch used in the second type of analog cell.

Referring again to FIG. 6A, a switch 602 with two input terminals Pin, Nin is coupled to the resistor network at two locations. Input terminal Pin is coupled to the resistor network between resistors 605 and 606, while input terminal Nin is coupled to the resistor network between resistors 606 and 607. The switch 602 operates identically to the switch 502 in the signal cell 500, by selectively decoupling, directly coupling, or cross coupling the input terminals Pin, Nin to the output terminals Pout, Nout. In particular, as shown in FIG. 6C, AND gate 660 and switches 651-654 of the skew cell 600 correspond to the AND gates 560 and switches 551-554 of switch 502.

The skew cell 600 (FIG. 6A) provides a predetermined differential analog signal at the output terminals K+, K−. Like the signal cell 500, the skew cell 600 generates its signal using a two phase process. The two phases are controlled by applying the CB1, CB2 and SH1, SH2 control signals to the CB and SH inputs, respectively. In the first phase, a plurality of switches are coupled to the capacitors 609. These switches include switch 610, which couples the front plates of the capacitors 609 to each other.

In the second phase, switch 611 couples a clamping voltage Vcl to the back plates of capacitors 609. Switches 611 are controlled via the SH signal, after it passes through delay, which may be implemented using a pair of series connected inverters 608. Finally, the COL signal controls the switches 612 to couple to capacitors 609 to the output terminals K+, K−. The differential analog at output terminals K+, K− may have a positive or negative offset, and is coupled in parallel (i.e., summed) with the output signal at the S+, S− terminals of the signal cell 500. The function of the skew cell 600 is to offset the signal produced by the signal cell 500 by a predetermined amount, in order to compensate for any parasitic offset (e.g., DC offsets) in the output of the signal cell. The parasitic offset can be predetermined and the skew cell 600 designed accordingly to output an inverse signal. Thus, when the outputs of the signal and skew cells are summed, the result is an output signal without any parasitic offsets.

Referring back to FIG. 4, this summed signal from cells 500, 600 is presented to the input terminals I+, I− of a differential charge amplifier 403. The differential charge amplifier 403 is used to provide sufficient driving strength to the signal to drive the analog-to-digital converter 106 (FIG. 2). The differential charge amplifier 403 also isolates the internal circuitry of the analog-to-digital converter 106 from the previous stages of the signal chain, thereby reducing noise.

The output of the differential charge amplifier 403 is routed to a switch 401 controllable by a signal SEL. The SEL switch is used to controllably couple the output signal of the differential charge amplifier 403 to sample-and-hold circuit 300. As previously discussed, the sample-and-hold circuit 300 applies the (analog) correction value generated by the offset correction block 400 to the pixel signal received from the analog signal chain 104.

Figure 8:
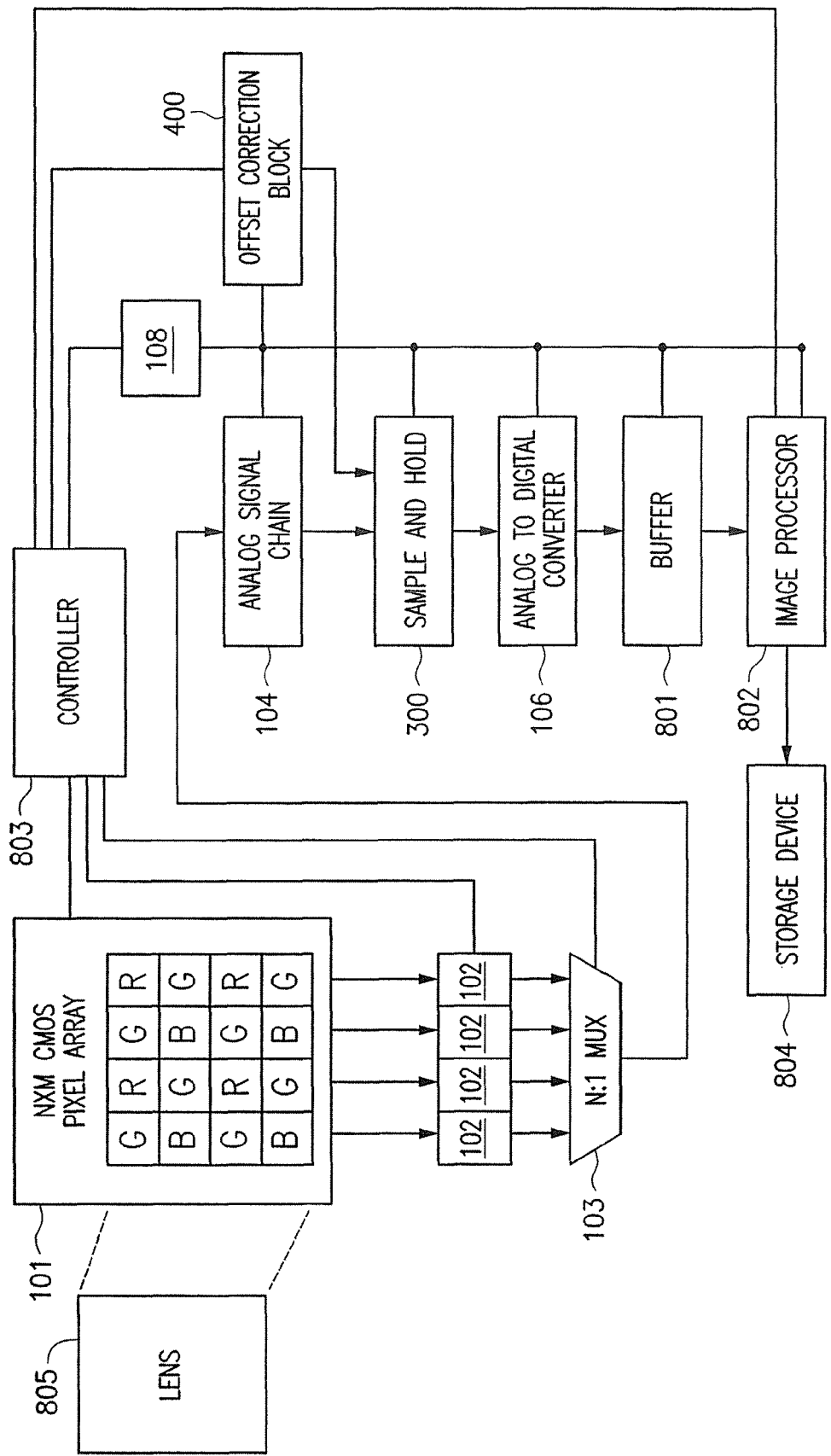
FIG. 8 is a imaging system.

FIG. 8 is an illustration of how the principles of the present invention might be used in an imaging system 800. The imaging system 800 may be, for example, a digital still camera or a video camera. The imaging system includes a lens 805 to focus a subject image upon a CMOS APS pixel array 101. The pixel array 101 might have red (R), green (G), and blue (B) pixels arranged in a Bayer pattern. The pixel array 101 is coupled to one or more controllers 803, which is also coupled to several other components of the imaging system, including the plurality of pixel buffers 102, the multiplxer 103, and the offset correction block 400. The controller 803 sequences these components, in coordination with a clock signal generated by clock 108, to transfer pixels signals from the pixels R, G, B of the pixel array 101 through the pixel buffers 102, multiplexer 103, and analog signal chain 104. The controller 803 also supplies a digital correction values to the digital offset block 400, which generates an analog signal which is applied to the pixel signal in the sample-and-hold block 300. The pixel signal is then converted into digital form by the analog-to-digital converter 106 and stored in a buffer 801. The above process is then repeated until every pixel has been processed. An image processor 802 may further process the data in buffer 801 (e.g., performing color interpolation) before storing the image in a storage device 804.

The present invention therefore provides an offset correction block 400 and a sample-and-hold circuit 300 to perform offset correction for an APS CMOS array. The offset correction block 400 converts a digital word into an analog signal as a linear function having either a positive or negative slope. This analog signal may be offset, either in the positive or negative direction by an analog skew signal. The combined signal is then presented to the ample-and-hold circuit, which performs offset cancellation in the charge domain, so that the analog signal presented to the analog-to-digital converter is corrected.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed is as new and desired to be protected by Letter Patent of the United States is:

1. An apparatus for processing a plurality of pixel signals, said apparatus comprising:
    a first circuit, comprising a first set of sample capacitors, a second set of sample capacitors, and a charge amplifier, said charge amplifier being controllably coupled to said first and second set of sample capacitors, for producing an analog correction signal;
    a second circuit comprising an amplifier, coupled to said first circuit, configured to receive an analog pixel signal from a third set of sample capacitors and, receive said analog correction signal from a fourth set of sample capacitors and produce a corrected analog signal by summing said analog pixel signal and said analog correction signal; and
    an analog-to digital converter configured to convert said corrected analog signal into a digital signal.

2. The apparatus of claim 1, wherein each of the plurality of pixel signals is associated with a particular color and the analog correction signal is generated based on the color associated with each of the pixel signals.

3. The apparatus of claim 1, wherein said analog correction signal, said analog pixel signal, and said corrected analog signal comprise single ended signals.

4. The apparatus of claim 1, wherein each of said first, second, third, and fourth sets of sample capacitors comprise single capacitors.

5. The apparatus of claim 1, wherein said analog correction signal, said analog pixel signal, and said corrected analog signal comprise differential signals.

6. The apparatus of claim 1, wherein each of said first, second, third, and fourth sets of sample capacitors comprise a pair of sample capacitors.

7. An apparatus for correcting for an unwanted offset voltage from a pixel in a pixel array, comprising:
    an offset correction block for receiving a digital correctional value and outputting an analog correction signal, said offset correction block comprising a first signal cell and a first skew cell; and
    a sample-and-hold circuit, said sample-and-hold circuit further comprising a charge amplifier having a first input coupled to a first set of capacitors charged by an electrical signal produced by said pixel and a second input coupled to a second set of capacitors charged by the analog correction signal, and outputting a compensated signal as a linear function of the charge on said first and second sets of capacitors.

8. The apparatus of claim 7, wherein said first signal cell further comprises:
    a programmable current source, for accepting a data portion of said digital correction value and producing a drive current proportional to the value of said data portion;
    a resistor network, coupled to the programmable current source, and having at least two nodes at different potentials; and
    a switching network having a pair of inputs coupled to said two nodes and a pair of outputs coupled to a pair of sampling capacitors, for accepting a sign bit portion of said digital correction value and for controllably inverting coupling or cross coupling said sampling capacitors with said two nodes, based on the sign bit portion of said digital correction value.

9. The apparatus of claim 7, wherein said analog correction signal, electrical signal produced by said pixel, and compensated signal are single ended signals and said first set of capacitors and second set of capacitors are each single capacitors.

10. The apparatus of claim 7, wherein said analog correction signal, electrical signal produce by said pixel, and compensated signal are differential signals and said first set of capacitors and second set of capacitors are each pairs of capacitors.

11. The apparatus of claim 7, wherein a skew signal is applied to an initial analog signal to produce the analog correction signal.

12. The apparatus of claim 7, wherein said first skew cell further comprises:
    a constant current source, for accepting an enable signal and for producing a driving current if said enable signal is at a first logical state;
    a resistor network, coupled to the constant current source, and having at least two nodes at different potentials; and
    a switching network having a pair of inputs coupled to said two nodes and a pair of outputs coupled to a pair of sample capacitors, for accepting a polarity signal and for controllably inverting coupling or cross coupling said sample capacitors with said two nodes, based on the polarity signal.

13. The apparatus of claim 7, wherein the first signal cell is configured for producing an initial analog signal if the pixel is a green pixel.

14. The apparatus of claim 13, wherein the offset set correction block further comprises a second signal cell for producing the initial analog signal if the pixel is not a green pixel; and
    wherein said first signal cell is activated when the pixel is a green pixel and deactivated when the pixel is not a green pixel, and where the second signal cell is activated when then the pixel is not a green pixel and deactivated when the pixel is a green pixel.

15. The apparatus of claim 13, wherein the first skew cell is configured for producing a skew signal if the pixel is a green pixel and wherein said offset correction block further comprises:
    a second signal cell for producing the initial analog signal if the pixel is not a green pixel; and
    a second skew cell for producing the skew signal if the pixel is not a green pixel;
    wherein said first signal cell and said first skew cell are activated when the pixel is a green pixel and deactivated when the pixel is not a green pixel, and where said second signal cell and said second skew cell are activated when then the pixel is not a green pixel and deactivated when the pixel is a green pixel.

16. The apparatus of claim 15, wherein said first and second skew cell each further comprise:
    a constant current source, for accepting an enable signal and for producing a driving current if said enable signal is at a first logical state; a resistor network, coupled to the constant current source, and having at least two nodes at different potentials; and
    a switching network having a pair of inputs coupled to said two nodes and a pair of outputs coupled to a pair of sample capacitors, for accepting a polarity signal and for controllably inverting coupling or cross coupling said sample capacitors with said two nodes, based on the polarity signal.

17. An imaging system comprising:
a pixel array comprising a plurality of pixels;
a controller, for supplying digital correction value corresponding to each of said plurality of pixels;
a digital-to-analog converter, for converting an electrical signal output by one of said plurality of pixels into a digital signal;
a storage device for storing said digital signal; and
a circuit for correcting for an unwanted offset voltage in said pixel, said circuit for correcting further comprising:
an offset correction circuit, coupled to said controller and receiving said digital correctional value and outputting an analog correction signal comprising at least first and second signal cells and first and second skew cells; and
a sample-and-hold circuit, said sample-and-hold circuit further comprising a charge amplifier having a first input coupled to a first set of capacitors charged by an electrical signal produced by said pixel and a second input coupled to a second set of capacitors charged by the analog correction signal, and outputting a compensated signal as a linear function of the charge on said first and second sets of capacitors.

18. The imaging system of claim 17, wherein said first and second signal cells each comprise:
a programmable current source, for accepting a data portion of said digital correction value and producing a drive current proportional to the value of said data portion;
a resistor network, coupled to the programmable current source, and having at least two nodes at different potentials; and
a switching network having a pair of inputs coupled to said two nodes and a pair of outputs coupled to a pair of sampling capacitors, for accepting a sign bit portion of said digital correction value and for controllably inverting coupling or cross coupling said sampling capacitors with said two nodes, based on the sign bit portion of said digital correction value.

19. The imaging system of claim 17, wherein said first and second skew cells each comprise:
a constant current source, for accepting an enable signal and for producing a driving current if said enable signal is at a first logical state;
a resistor network, coupled to the constant current source, and having at least two nodes at different potentials; and
a switching network having a pair of inputs coupled to said two nodes and a pair of outputs coupled to a pair of sample capacitors, for accepting a polarity signal and for controllably inverting coupling or cross coupling said sample capacitors with said two nodes, based on the polarity signal.

* * * * *